US 6,714,855 B2

(12) United States Patent
Pfitz et al.

(10) Patent No.: US 6,714,855 B2
(45) Date of Patent: Mar. 30, 2004

(54) METHOD, COMPUTER PROGRAM AND CONTROL AND/OR REGULATING DEVICE FOR OPERATING AN INTERNAL COMBUSTION ENGINE

(75) Inventors: Manfred Pfitz, Vaihingen (DE); Erwin Kirschner, Heimerdingen (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 09/971,941

(22) Filed: Oct. 5, 2001

(65) Prior Publication Data
US 2002/0087259 A1 Jul. 4, 2002

(30) Foreign Application Priority Data
Oct. 10, 2000 (DE) ......................... 100 49 907

(51) Int. Cl.$^7$ ............................................. G06F 19/00
(52) U.S. Cl. ..................... 701/114; 701/115; 123/350; 123/396
(58) Field of Search .................. 701/114, 115; 123/488, 406.52, 350, 359–361, 339.23, 376, 403, 404, 396, 399; 73/115, 117.3, 118.1

(56) References Cited

U.S. PATENT DOCUMENTS

| | | | | |
|---|---|---|---|---|
| 4,075,835 A | * | 2/1978 | Hattori et al. | 123/684 |
| 4,600,993 A | * | 7/1986 | Pauwels et al. | 701/103 |
| 4,938,195 A | * | 7/1990 | Miyazaki et al. | 123/488 |
| 5,003,950 A | * | 4/1991 | Kato et al. | 123/406.46 |
| 5,619,967 A | * | 4/1997 | Streib | 123/399 |
| 6,453,229 B1 | * | 9/2002 | Ohkuma et al. | 701/109 |

* cited by examiner

Primary Examiner—Willis R. Wolfe
Assistant Examiner—Johnny H. Hoang
(74) Attorney, Agent, or Firm—Michael J. Striker

(57) ABSTRACT

A method for operating an internal combustion engine includes the steps of determining a pressure in a suction portion from a position of a throttle flap, passing a signal produced from the position of the throttle flap through a delay element, using the passed signal for forming a limit for a permissible value region, utilizing as the delay means mechanism at least two delay elements, such that a delay of one of the delay elements is switched off when a speed with which the position of the throttle valve changes lies above a positive limiting value, and the delay of the other delay element is switched off when the speed with which the position of the throttle valve changes lies below a negative limiting value.

9 Claims, 3 Drawing Sheets

METHOD, COMPUTER PROGRAM AND CONTROL AND/OR REGULATING DEVICE FOR OPERATING AN INTERNAL COMBUSTION ENGINE

BACKGROUND OF THE INVENTION

The present invention relates to a method for operating an internal combustion engine, with which the pressure in suction portion is determined from the position of a throttle flap, a signal produced from the position of the throttle flap is passed through at least one delay element and the passed signal is used for forming a limit for a permissible value region.

Such a method is known. In the method the angle of a throttle flap which is taken by a sensor is stored in a low pass filter. A maximal and a minimal value is formed from the filtered and the unfiltered signal, from which an upper limit and a lower limit for a permissible pressure region is determined. Simultaneously the pressure is detected by a sensor. This is performed so that the pressure is read over a segment (time between two ignitions) per 1 ms and added. Then a pressure determination is performed, in that the added value is divided by the number of the tests (arithmetical average value formation). If the pressure detected by the sensor is located outside of the permissible value region, an input in an error storage is performed. Moreover instead of the pressure value detected by the pressure sensor, the pressure value determined from the angle of the throttle flap is used for calculation of filling of a combustion chamber of the internal combustion engine. Thereby a second pressure signal is modeled, which is suitable for monitoring (diagnosing) of the measured pressure signal of the sensor.

The basis of the diagnosis method is therefore the determination of the suction pipe pressure from two different ways. On the one hand the suction pressure is determined directly by a sensor. The thusly obtained value is used for determination of the air filling in a combustion chamber. On the other hand a corresponding pressure is determined from the angle of the throttle flap and the rotary speed. In the case of a deviation of a pressure, a faulty pressure sensor is at issue. Since during a fast change of the angle of the throttle flap due to the compressibility of the air and the suction pipe time constants the actual pressure changes only with a low speed, the signal produced by the throttle flap must be delayed. This is performed by the low pass filter.

It has been however determined that there are situations in which an input in the error storage is performed, while the pressure sensor operates obviously correctly. Such an error recognition of a faulty operating pressure sensor can for example take place when the throttle flap is moved highly dynamically. In this condition for example a very fast opening and an immediately following fast closing of the throttle flap is produced.

SUMMARY OF THE INVENTION

Accordingly, it is an object of the present invention to provide a method of the above mentioned general type which avoids the disadvantages of the prior art.

More particularly it is an object of the present invention to provide a method of the above mentioned type, which excludes the above mentioned faulty detection.

In keeping with these objects and with others which will become apparent hereinafter, one feature of present invention resides, briefly stated, in a method in accordance with which two delay elements are provided, wherein the delay of one delay element is switched off when the speed of changing the position of the throttle flap is located above a positive limiting value and the delay of the other delay element is switched of when the speed of changing and the position of the throttle valve flap is located under a negative limiting value.

In accordance with the present invention it has been determined that the faulty detection or in other words the faulty response of the diagnosis while the pressure sensor is in order is caused in the prior art because at high movement speed of the throttle flap and an abrupt direction change of the movement of the throttle flap, the time for the delay element is too short to swing to a target value. During such a direction change of the movement of the throttle flap, a sign change of the movement speed of the throttle flap is performed, or the so-called throttle flap gradient. When the sign change is performed at a time point at which the low pass filter did not swing to its target value resulting from the opening movement of the throttle flap, a permissible value region is obtained which is located under the actual pressure acting in the suction portion and detected by the pressure sensor. For better understanding such process is illustrated in FIG. 4.

This problem is resolved in the present invention in that, the two delay elements are provided. In the case of a high speed of the throttle flap, the delay of one of the both delay elements is switched off. This means that the stored signal passes through the delay element with a delay, the output signal of the delay element is equal to the input signal. When the movement speed of the throttle flap is again outside the high dynamic region, or in other words under the limiting speed, a normal delay of the signal is performed by the delay element. With this features, in the case of high movement speeds of the throttle flap no delayed swinging of the delay element to a target value is performed, but instead the output signal of the delay element is directly coupled to the input value. During following movement of the throttle flap in an opposite direction, also with a correspondingly higher speed or dynamic of the throttle flap, the short-time switched off delay element remains active and delays the input signal correspondingly, while as a start value for the delay, the signal which is reached during the switched-off delay is utilized.

In accordance with the present invention in the event of a fast opening movement in the throttle flap, one delay element is inactive, while to the contrary the other delay element is active. In the case of a fast closing movement of the throttle flap the one delay element is active, while to the contrary the other delay element is inactive.

In the inventive method it is guaranteed with the signals which pass through both delay elements, a permissible value region can be formed, which with the correctly operating pressure sensor corresponds to actually permissible region.

In accordance with a further embodiment of the present invention, the delay element includes at least one low pass filter. With such low pass filter, a delay element can be realized with a software in a simple way. It is also possible to form the delay element for example as a controller, in particular PI controller.

It can be further provided that the both limiting values have the same amount and differ by the signs. This is provided especially when the fluid conditions are such that the characteristics during the pressure increase and the pressure decrease in each region of the suction portion in which the pressure sensor is arranged, do not substantially differ from one another.

In accordance with a further embodiment of the present invention, at least one characteristic field is provided, with which from the rotary speed of the internal combustion engine and from the signal produced from the position of the throttle flap, the corresponding pressure is determined in the suction portion. With such a characteristic field, there is a simple feature to realize, with which the relatively precise value for the pressure in the suction portion can be determined. The characteristic field can be arranged before the delay elements as seen in a signal flow direction. In another case, the signals passing through the delay elements are each stored in its own characteristic field.

It is especially advantageous when the pressure in the suction portion is measured and compared with the permissible value region. Thereby a diagnosis of the measuring device is possible, which measures the pressure in the suction portion.

An error command and/or an input in an error storage is performed for example when the measured pressure is located outside the permissible value region. In this way the user and/or a person who performs a maintenance becomes aware of a faulty pressure sensor.

In addition or alternatively it can be provided that when the measured pressure is located outside the permissible value region, the determination of the filling of a combustion chamber of the internal combustion engine is performed on the basis of the signal produced from the position of the throttle flap. If the measured pressure is located outside of the permissible value region, it can be determined that the pressure sensor operates in a faulty manner. The pressure sensor is however conventionally provided for the determination of the filling of the combustion chamber. When the pressure sensor is diagnosed as faulty, the less accurate, but reliable operation of determination of the air filling can be determined from the position of the throttle valve.

The present invention deals also with a computer program, with which the performance of the above mentioned method is possible, when it is carried out on a computer. It is especially advantageous when the computer program is stored on a storage, in particular a flash memory.

The present invention also deals with a control and/or regulating device for operating an internal combustion engine. With the use of this device, in connection with the above mentioned method, the advantages are obtained which are specified herein above, when the control and/or regulating device is suitable for controlling and/or regulation of the above mentioned method.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
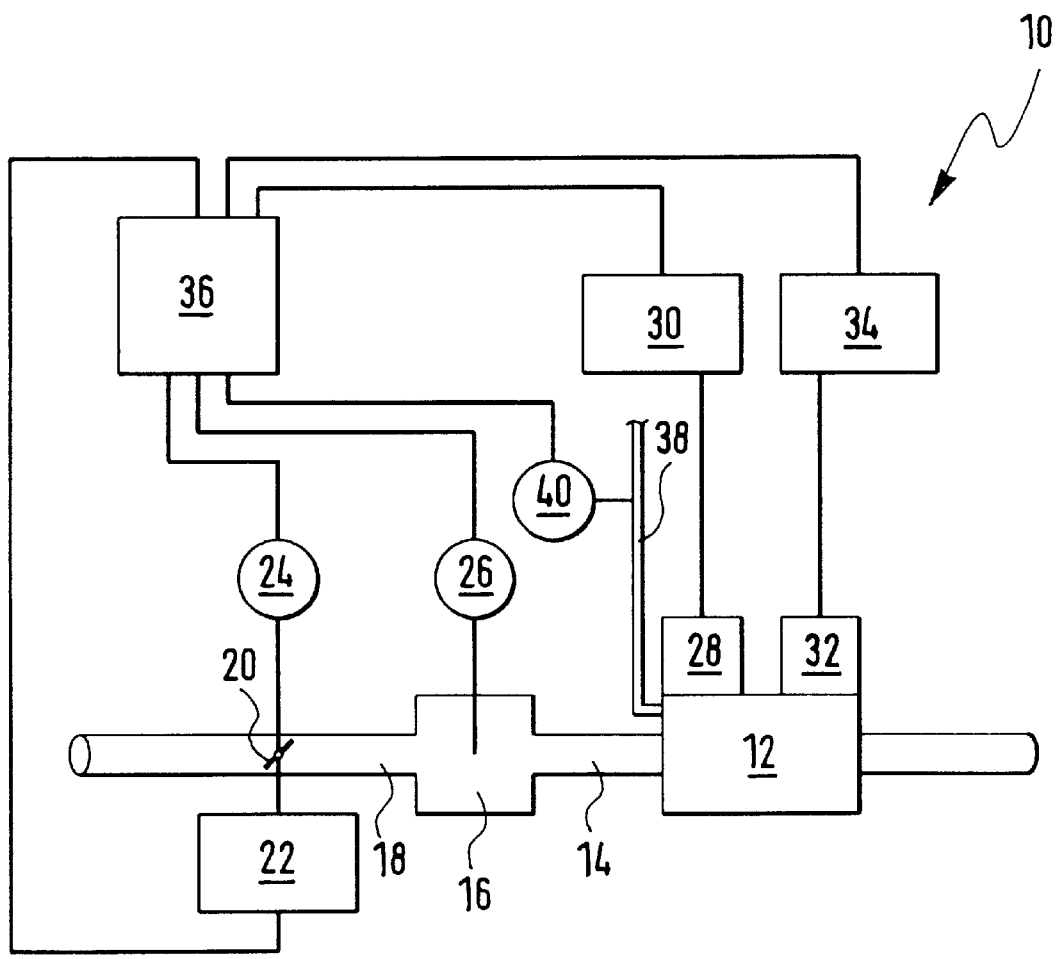
FIG. 1 is a view showing a block diagram of an internal combustion engine.

FIG. 1 shows an internal combustion engine which is identified as a whole with reference numeral 10. It includes a combustion chamber 12 which is connected through a not shown inlet valve with a vibration pipe 14. The vibration pipe 14 opens to a collector 16 which is connected with a suction pipe 18.

A throttle flap 20 is movably arranged in the suction pipe 18. The movement of the throttle flap 20 is performed by an adjusting motor 22, and each position is determined by a position sensor 24. The pressure in the collector 16 is detected by a pressure sensor 26. The combustion chamber 12 is supplied with fuel through an injection valve 28 and a fuel system 30. The ignition in the combustion chamber 12 is performed by an ignition candle 32 which is connected with an ignition device 34.

The internal combustion engine 10 further includes a control and regulating device 36. It is connected at the input side with the position sensor 24 and the pressure sensor 26. At the output side it is connected with the adjusting motor 22, the ignition device 34 and the injection valve 28.

The internal combustion engine 10 can be provided with several combustion chambers and several vibration pipes which open each into the collector 16. Furthermore, the internal combustion engine 10 shown in FIG. 1 operates in accordance with the principle of the gasoline-direct injection. The methods represented on the subsequent figures are however suitable for internal combustion engines with a suction pipe injection, in which the injection valve, for example is arranged in the oscillation pipe. The internal combustion engine 10 also has a crankshaft 38, whose rotary speed is detected by a rotary speed sensor 40.

Figure 2:
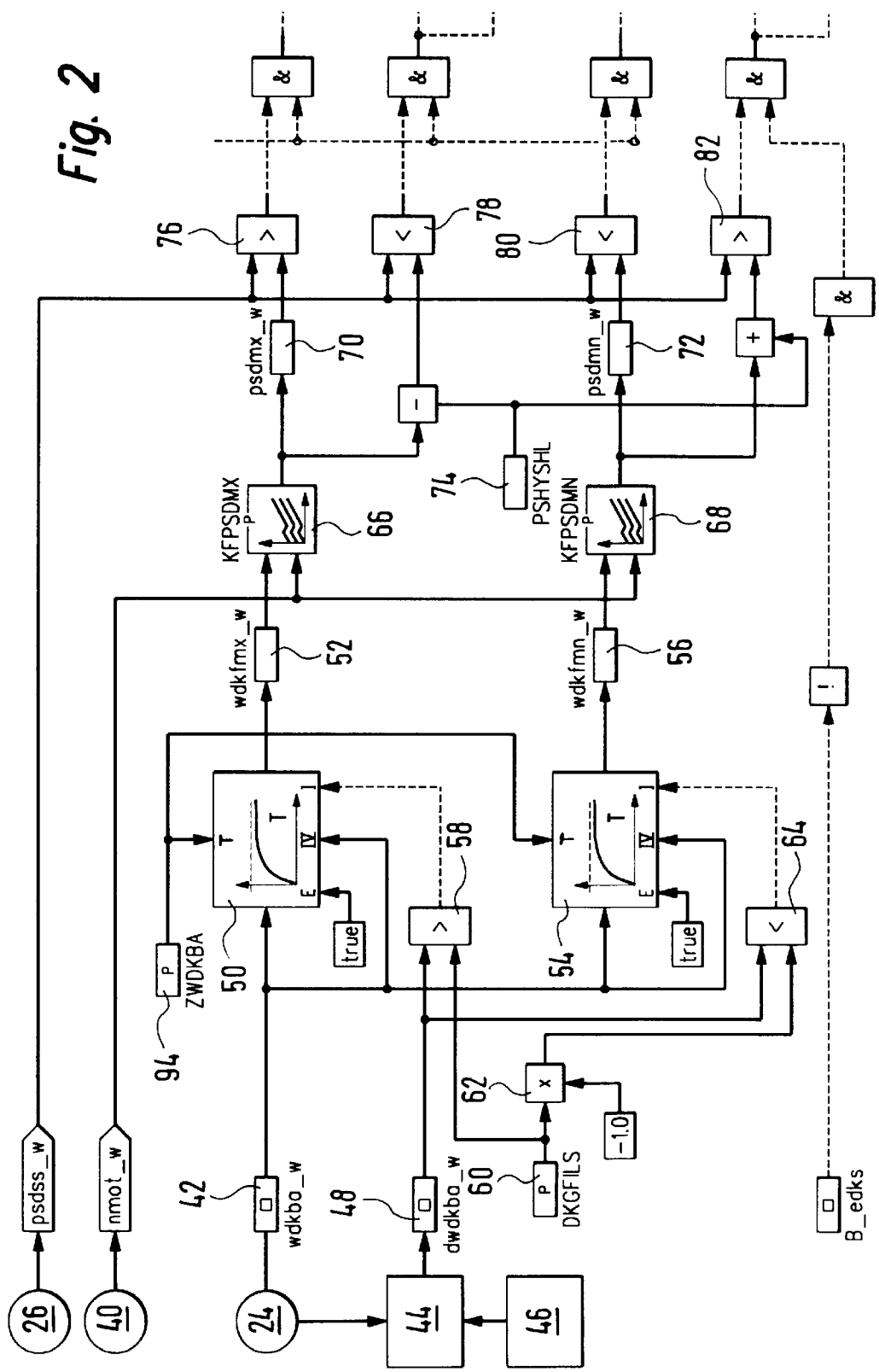
FIG. 2 is a flow diagram of a method for operating the internal combustion engine of FIG. 1 in accordance with the present invention.

The operation of the internal combustion 10 is illustrated in FIG. 2:

A signal wdkba is outputted at the position sensor 24 of the throttle flap 20 and corresponds to the actual angular position of the throttle flap 20, in block 42. The signal from the position sensor 24 is used further in a block 44 for determining a speed of the movement of the throttle flap 20. This calculation is performed with the use of time signals from a timer 46. The determined movement speed of the throttle flap 20 provided with sign, which is also identified as a throttle flap gradient is identified in block 48 as dwdkba.

The actual position wdkba of the throttle flap 20 is stored in the block 50 in a first low pass filter. The output signal from the first deep pass filter 50 is identified as wdkfmx in block 52. As will be explained herein after, this signal wdkfmx serves for determination of an upper limit of a permissible value region for the pressure psdss acting in the collector 16 which is determined by the pressure sensor 26.

The angular position wdkba of the throttle flap 20 is stored in a second low pass filter 54. Its output signal is identified as wdkfmn in block 56 and serves analogously for determination of a lower limit of a permissible value region for the pressure psdss.

In block 58 the throttle flap gradient dwdkba is compared with a positive lifting value DKGFILS. The limiting value DKGFILS is available in a fixed value storage 60. When the comparison performed in the block 58 provides that the value is true, the throttle flap gradient dwdkba is greater than the limiting value DKGFILS, and the first low pass filter 50 is initialized directly with the position wdkba of the throttle flap 20, or in other words the filtering or the delay of the deep pass filter 50 is switched off. This condition takes place until the throttle flap gradient dwdkba is again located under the limiting value DKGFILS.

In block 62, the limiting value DKGFILS is multiplied with the factor −1, and in block 64 compared with the sign-provided throttle flap gradients dwdkba. If the throttle flap gradient is negative, or in other words a closing movement of the throttle flap 20 is performed, and the throttle flap gradient dwdka is located under the limit DKGFILS, the second low pass filter 54 is initialized with the position wdkba of the throttle valve 20, or in other words the filtering or delay is switched off. If the throttle flap gradient dwdkba exceeds again the limit—DKGFILS, the delay of the low pass filter 54 is switched in again. The meaning of these features will be explained herein below.

The output signals wdkfmx and wdkfmn of the first low pass filter 50 and the second low pass filter 54 are stored in a characteristic field KFPSDMX and KFPSDMN (blocks 66 and 68). In the characteristic fields KFPSDMX and KFPSDMN further the actual rotary speed nmot of the internal combustion engine 10 detected by the rotary speed sensor 40 is stored. The characteristic field KPFDSMX (block 66) is also identified as max characteristic field produces as an output value of an upper limiting value psdmx for the pressure in the collector 16. Analogously, the characteristic field KFPSDMN (block 68) identified as min characteristic field produces a lower limiting value psdmn (block 72) for the pressure in the collector 16. The limiting values psdmx and psdmn are loaded with a hystheris factor PSHYSHL (block 74), and compared in the blocks 76–82 with the pressure psdss detected by the pressure sensor 26. If the pressure psdss measured by the pressure sensor 26 is located outside of the value regions defined by the limits psdmx and psdmn, an error command is provided to the user of the internal combustion engine as well as an input in an error storage (not shown), for example so that it can be read during a maintenance.

The meaning of the switching off and switching on of the delay is as follows:

When a slow opening of the throttle flap 20 is performed, then the throttle flap gradient DWDKBA is located under the limit DKGFILS and above the negative limit—dkgfils, so that both low pass filters 50 and 54 remain activated and a delayed signal wdkfmx and wdkfmn (blocks 52 and 56) are outputted. With this delay of the signal performed in the low pass filters 50 and 54, the actual calculation is provided that during an opening of the throttle flap 20 due to the limited flow speed in the suction pipe 16, only a slow filling of the collector 16 takes place, the pressure psdss in the collector 16 takes place, the pressure psdss in the collector 16 increases only relatively slowly. The same is true for a slow closing movement of the throttle flap 20. This both "normal" regions of the speed dwdkba of the throttle flap 20 are identified in FIG. 6 with the reference numerals 84 or 86.

Figure 3:
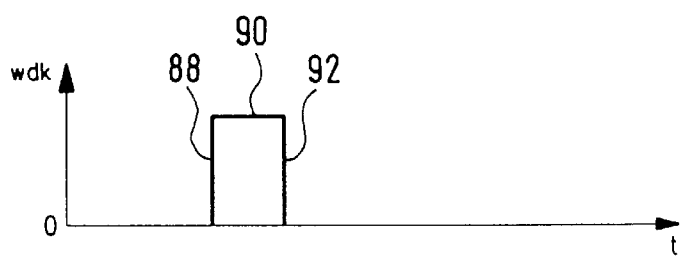
FIG. 3 is a view showing a diagram which shows the angle of a throttle flap or the time in accordance with the present invention.
Figure 4:
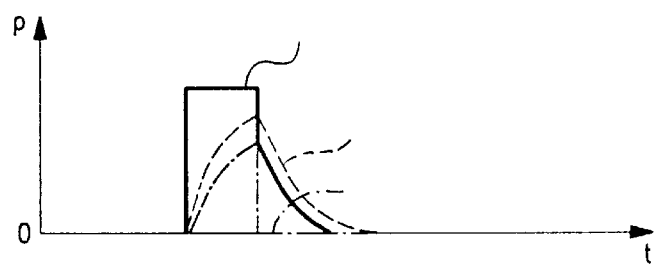
FIG. 4 is a view showing a diagram which shows the determined and real pressure course in accordance with the prior art.
Figure 5:
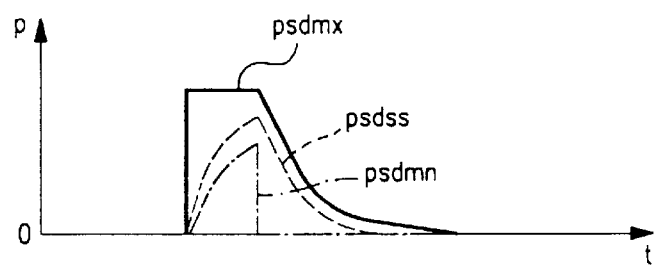
FIG. 5 is a view showing a diagram which is similar to the diagram of FIG. 4 for the real pressure course and the pressure course determined in accordance with the method of FIG. 3 in accordance with the present invention.
Figure 6:
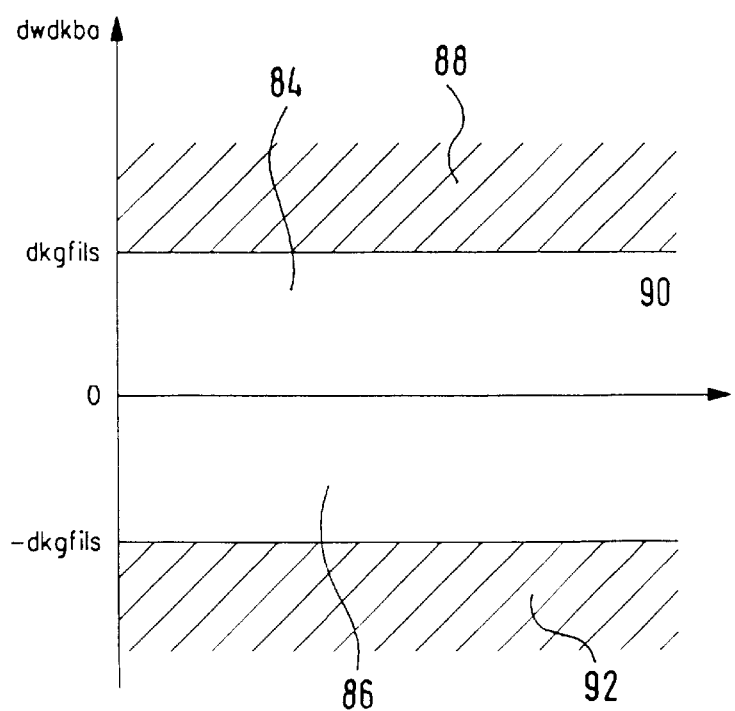
FIG. 6 is a view showing a diagram showing the sign-dependent speed regions of the throttle flap movements.

When the throttle flap gradient dwdkba exceeds the positive limiting value DKGFILS, the speed region identified with 88 in FIG. 6 is in action. In extreme case can therefore the throttle flap 20 open in a sudden fashion as shown in FIG. 3 and also identified with 88. As explained herein above, in this case the first low pass filter 50 is directly initialized with the throttle flap angle wdkba, so that the output signal wdkfmx is delayed and thereby the throttle flap angle wdkba is identical. Correspondingly, the pressure psdmx (block 70) determined in the characteristic field KFPSDMX (block 66) increases in a sudden fashion as shown in FIG. 5. A swinging of the value psdmx to a target value is thereby not performed. A different situation is however with the pressure psdmn (block 72), which is determined in the characteristic field KFPSDMN from the delayed value wdkfmn. The value wdfmn is delayed, since with a sudden opening of the throttle flap 20 the low pass filter 54 remains activated.

It is to be understood that with the constant throttle flap position 20 (this region is identified in FIG. 3 with the reference numeral 90), both low pass filters 50 and 54 are active. Then the value wdkfmx however corresponds to the target value, also the pressure psdmx corresponds to a constant pressure. The different situation is with the pressure psdmn which being delayed by the second low pass filter 54 is increased during the phase identified as 90. The time constant ZWDKBA (block 94 in FIG. 2) which is available in a block 92 is selected so that the pressure psdmn remains in each case under the pressure psdss which is adjusted with the correctly operating pressure sensor 26. In this way, with the both values psdmx and psdmn also in the case of sudden opening of the throttle flap 20 a permissible value region is defined for the pressure psdss determined by the pressure sensor 26 in which the error diagnosis of the pressure sensor 26 are excluded.

A sudden closing of the throttle flap 20 is identified in FIGS. 3 and 6 with reference numeral 92. Analogously to the above, the first low pass filter 50 remains active, while the second low pass filter 54 passes the position value dwdkba of the throttle flap 20 unfiltered and outputs as the value wdkfmn. As can be seen from FIG. 5, in the case of such a sudden closing of the throttle flap 20, the computed pressure psdmn drops suddenly. In the first deep pass filter 50. To the contrary, the position wdkba of the throttle valve 20 is delayed, starting from the jump-like value obtained in the phase 88 and the value contained in the phase 90. Here also it is important that time constant ZWDKBA is selected so that the pressure psdmx lowers not faster than the pressure psdss in the collector 16 determined in the case of the correctly operating pressure sensor 26.

Due to the above mentioned features it is provided that, a permissible value region is available, in which in the event of a highly dynamic behavior of the throttle flap 20 the pressure sensor operates error-free.

It will be understood that each of the elements described above, or two or more together, may also find a useful application in other types of methods constructions differing from the types described above.

While the invention has been illustrated and described as embodied in method, computer program and control and/or regulating device for operating an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method of operating an internal combustion engine, comprising the steps of determining a pressure in a suction portion from a position of a throttle flap; passing a signal produced from the position of the throttle flap through at least one delay element; using the passed signal for forming a limit for a permissible pressure region, wherein at least two delay elements are provided, wherein a delay of one of said delay elements is switched off when a speed with which the position of the throttle changes lies above a positive limiting value, and the delay of the other delay element is switched off when the speed with which the position of the throttle changes lies below a negative limiting value.

2. The method as defined in claim 1; and further comprising providing at least one low pass filter in each of said delay elements.

3. The method as defined in claim 1; both limiting values are equal and have different signs.

4. The method as defined in claim 1; and further comprising providing at least one characteristic field, wherein a corresponding pressure is determined in the suction region with the at least one characteristic field from a rotary speed of the internal combustion engine and from a signal produced by the position of the throttle flap.

5. The method as defined in claim 4; and further comprising the step of storing the signals which pass through the delay elements each in a separate characteristic field.

6. The method as defined in claim 1; and further comprising the steps of measuring the pressure in the suction region and comparing the pressure with a permissible value range.

7. The method as defined in claim 6; and further comprising providing a step selected from the group consisting of providing an error command, inputting into an error storage, and both, when a measured parameter is located outside the permissible value range.

8. The method as defined in claim 7; and further comprising the step of performing a determination of filling of a combustion chamber of the internal combustion engine on the basis of the signal provided from the position of the throttle flap, when the measured parameter is located outside the permissible value range.

9. A computer program for performing a method of operating an internal combustion engine with a computer, the method comprising the steps of determining a pressure in a suction portion from a position of a throttle flap, passing a signal produced from the position of the throttle flap through a delay element, using the passed signal for forming a limit for a permissible pressure region, providing at least two delay elements, wherein a delay of one of said delay elements is switched off when a speed with which the position of the throttle changes lies above a positive limiting value, and the delay of the other delay element is switched off when the speed with which the position of the throttle changes lies below a negative limiting value.

* * * * *